United States Patent
Moran et al.

(10) Patent No.: US 6,921,509 B2
(45) Date of Patent: Jul. 26, 2005

(54) COMPOSITE INTERLAYER FOR LAMINATED GLASS

(75) Inventors: James R. Moran, Longmeadow, MA (US); Francis G. Gerberich, Wilbraham, MA (US)

(73) Assignee: Solutia Inc., St. Louis, MO (US)

(*) Notice: Subject to any disclaimer, the term of this patent is extended or adjusted under 35 U.S.C. 154(b) by 0 days.

(21) Appl. No.: 10/192,785

(22) Filed: Jul. 10, 2002

(65) Prior Publication Data

US 2003/0118840 A1 Jun. 26, 2003

Related U.S. Application Data

(60) Provisional application No. 60/304,594, filed on Jul. 11, 2001.

(51) Int. Cl.[7] .............................................. B32B 31/30
(52) U.S. Cl. ............................ 264/173.16; 156/244.11; 264/173.17
(58) Field of Search ............... 156/244.11; 264/173.16, 264/173.17; 428/216, 336, 423.7, 424.4, 425.3, 425.6

(56) References Cited

U.S. PATENT DOCUMENTS

| | | | |
|---|---|---|---|
| 3,388,032 A | 6/1968 | Saunders | 161/183 |
| 3,458,388 A | 7/1969 | Moynihan | 161/165 |
| 3,864,204 A | 2/1975 | Shorr et al. | 161/190 |
| 3,958,245 A | 5/1976 | Cherenko et al. | 343/713 |
| 3,971,864 A | 7/1976 | Beestrice et al. | 428/423 |
| 4,027,061 A | 5/1977 | Cartier et al. | 428/213 |
| 4,073,986 A | 2/1978 | Keslar et al. | 428/38 |
| 4,081,581 A | 3/1978 | Littell, Jr. | 428/138 |
| 4,121,014 A | 10/1978 | Shaffer | 428/412 |
| 4,436,784 A * | 3/1984 | Ehrhart | 428/423.1 |
| 4,556,600 A | 12/1985 | Kraemling et al. | 428/216 |
| 4,592,947 A | 6/1986 | Hunter et al. | 428/212 |
| 4,632,877 A | 12/1986 | Watanabe et al. | 428/409 |
| 4,643,944 A | 2/1987 | Agethen et al. | 428/349 |
| 4,666,758 A | 5/1987 | Hunter et al. | 428/212 |
| 4,705,721 A | 11/1987 | Frisch et al. | 428/349 |
| 4,747,896 A | 5/1988 | Anastasie | 156/85 |
| 4,879,183 A | 11/1989 | Mannheim | 428/437 |
| 4,923,757 A | 5/1990 | O'Dwyer et al. | 428/425.6 |
| 4,952,457 A | 8/1990 | Cartier et al. | 428/425.6 |
| 4,973,511 A | 11/1990 | Farmer et al. | 428/216 |
| 5,002,820 A | 3/1991 | Bolton et al. | 428/215 |
| 5,132,162 A | 7/1992 | De Paoli | 428/192 |
| 5,145,744 A | 9/1992 | Cartier et al. | 428/423.7 |
| 5,589,272 A | 12/1996 | Braun et al. | 428/425.6 |
| 5,763,089 A | 6/1998 | Chaussade et al. | 428/425.3 |
| 5,766,755 A * | 6/1998 | Chaussade et al. | 428/332 |
| 5,932,329 A | 8/1999 | Frost et al. | 428/214 |

FOREIGN PATENT DOCUMENTS

| | | | |
|---|---|---|---|
| EP | 0 373 139 | 6/1990 | B32B/27/30 |
| EP | 0 393 007 | 10/1990 | B32B/27/40 |

* cited by examiner

Primary Examiner—D. S. Nakarani
(74) Attorney, Agent, or Firm—Howrey Simon Arnold & White, LLP

(57) ABSTRACT

A composite interlayer suitable for using laminated glass includes a layer of plasticized polyvinyl butyral sandwiched between second and third polymeric layers. In a preferred embodiment, at least one and preferably both of the second and third layers are less than 5 mils thick and formed of polyurethane.

4 Claims, No Drawings

COMPOSITE INTERLAYER FOR LAMINATED GLASS

This application claims the benefit of U.S. provisional application Ser. No. 60/304,594, filed Jul. 11, 2001.

BACKGROUND OF THE INVENTION

The present invention relates to laminated glass and the polymeric layers used therein. More particularly, the present invention relates to multilayer composite interlayers used in laminated glass wherein one of the layers is plasticized polyvinyl butyral (PVB). A key performance attribute of such laminated glass is penetration resistance which is normally determined via the 2.27 kg (5 lb.) ball drop test wherein a Mean Break Height (MBH) can be measured via the staircase or energy methods. Automotive windshields for use in vehicles in the United States must pass the minimum penetration resistance specification (100% pass at 12 feet) found in the ANSI Z26.1 code. In other parts of the world there are similar codes that are required to be met. There are also specific code requirements in both the US and Europe for use of laminated glass in architectural applications wherein minimum penetration resistance must be met.

The staircase method utilizes an impact tower from which the steel ball can be dropped from various heights onto a 30.5×30.5 cm sample. The MBH is defined as the ball drop height at which 50% of the samples would hold the ball and 50% would allow penetration. The test laminate is supported horizonally in a support frame similar to that described in the ANSI Z26.1 code. If necessary an environmental chamber is used to condition laminates to the desired test temperature. The test is performed by supporting the sample in the support frame and dropping a ball onto the laminate sample from a height near the expected MBH. If the ball penetrates the laminate, the result is recorded as a failure and if the ball is supported, the result is recorded as a hold. If the result is a hold, the process is repeated from a drop height 0.5 m higher than the previous test. If the result is a failure, the process is repeated at a drop height 0.5 m lower than the previous test. This procedure is repeated until all of the test samples have been used. The results are then tabulated and the percent hold at each drop height is calculated. These results are then graphed as percent hold versus height and a line representing the best fit of the data is drawn on the graph. The MBH can then be read from the graph at the point where the percent hold is 50%.

The energy test method determines the MBH by applying the principle of conservation of energy to a ball impacting a laminate. The difference in energy contained by the ball after penetrating through a laminate is equal to the amount of energy absorbed by the laminate. The energy of the ball as it strikes the laminate can be calculated from the drop height. The energy of the ball after it exits the laminate can be determined by measuring the velocity of the ball as it passes two magnetic field detector coils which are separated by a known, fixed distance beneath the laminate. These values can then be used to calculate the MBH.

In order to achieve acceptable penetration resistance (or impact strength) for a glass/PVB/glass laminate, it is essential for the interfacial glass/PVB adhesion levels to be maintained at about 3–7 Pummel units. Acceptable penetration resistance is achieved at a pummel adhesion value of 3 to 7, preferably 4 to 6. At a pummel adhesion value of less than 2, too much glass is lost from the sheet and glass spalling during impact as well as problems with laminate integrity (i.e., delamination) and long term durability can occur. At a pummel adhesion of more than 7, adhesion of the glass to the sheet is generally too high and results in a laminate with poor energy dissipation and low penetration resistance.

Adhesion of PVB to glass is measured using a pummel adhesion test (pummel adhesion value has no units) that is routinely used for quality control purposes in the laminated glass industry. Glass/PVB/glass laminates are prepared, conditioned to −18° C. (0° F.) and each is manually "pummeled" with a 1 pound (454 g) ball peen hammer to break the glass. All broken glass unadhered to the PVB sheet is removed. The glass left adhered to the sheet is visually compared with a set of standards of known pummel scale, the higher the number, the more glass that remains adhered to the sheet— i.e. at pummel zero no glass is adhered and at pummel 10, 100% of the glass is adhered to the sheet surface.

Another factor in addition to adhesion that is an important consideration for determining penetration resistance is the PVB film thickness in the laminate. Since a large percentage of PVB interlayer used in the production of windshields is heated and then shaped/stretched to achieve a curved color band to conform to the vehicle roof line, a combination of too high adhesion and thin PVB interlayer can also cause finished windshields to fail the required penetration resistance performance standard. Because it is not possible to reduce adhesion (and achieve acceptable penetration resistance) after windshields are laminated, windshields must be destroyed if they fail to meet the minimum requirements.

In order to make acceptable interlayer products for use in laminated glass applications, significant efforts are expended to manufacture product with consistent adhesion performance. This is done via tight manufacturing control of resin, plasticizer and other components as well as quality control evaluation of peel adhesion for each lot of interlayers that are produced. PVB interlayers are also manufactured at a controlled level of moisture since interlayer moisture has a large influence on PVB/glass adhesion levels. On the customer's side, there are numerous factors that can affect PVB/glass adhesion including glass source, glass washing, interlayer moisture content, etc. It is extremely important to maintain laminate assembly rooms and PVB blank storage rooms at controlled humidity and temperature to prevent changes in interlayer moisture content. Secondary processing operations such as PVB shaping described in a previous section can result in changes in PVB interlayer moisture content and have accompanying significant effects on PVB/glass adhesion levels and penetration resistance. It is often possible to have very different adhesion behavior on each glass surface or variable/spotty adhesion within a windshield due to glass surface cleanliness that can result in unacceptable penetration resistance and again unacceptable quality. A small percentage of windshield production must be destructively tested to assure that the manufactured product meets the targeted pummel adhesion and required MBH specifications.

Another significant performance deficiency with PVB based laminates is the effect of temperature on penetration resistance. At 0° F. the observed MBH is about 30–40% of the MBH that is achieved at 75° F.

It has been known for a long time that with proper selection of the urethane polymer structure (in particular, the soft segment portion) that the sensitivity of the penetration resistance to lower test temperatures for glass/PU/glass laminates can be greatly reduced.

Another significant use of polyurethane interlayers wherein PVB interlayers do not participate is in the fabrication of specialty laminates involving glass/polycarbonate/glass wherein penetration resistance of the glass laminate is predominately controlled by the polycarbonate component and the PU component acts primarily as an adhesive for the laminate construction. Plasticizers used in all commercially available PVB interlayers chemically attack the polycarbonate surface resulting in a crazing/haze and unacceptable quality.

Glass/PU/glass laminates typically show excellent resistance of PU/glass adhesion to high humidity and temperature in contrast to PVB based laminates.

In spite of the benefits displayed by polyurethane based laminates, such laminates have not replaced PVB based laminates because of the higher cost of polyurethane polymer. Accordingly, there exists a need in the art for an interlayer that can be used in laminated glass which minimizes the effects of temperature and adhesion on observed penetration resistance with the lower cost and other properties associated with PVB based laminates. The present invention provides a composite interlayer that incorporates many of these benefits.

SUMMARY OF THE INVENTION

The present invention provides an improved composite interlayer suitable for use in laminated glass. In a preferred embodiment, the composite includes a layer of plasticized PVB sandwiched between second and third polymeric layers. In a preferred embodiment, at least one of the second and third layers is polyurethane less than 5 mils thick. Both the second and third layers are initially formed from unplasticized polyurethane less than 5 mils thick in one preferred embodiment but became plasticized by plasticizer migration from the PVB. In another preferred embodiment, plasticized polyurethane is used to form the second and third layers.

DETAILED DESCRIPTION OF THE PREFERRED EMBODIMENTS

The present invention is directed to a multilayer composite interlayer for use in laminated glass. In a preferred embodiment, two thin layers (0.001 to 0.005 inches) of polyurethane are sandwiched around a core layer of plasticized polyvinyl butyral. The laminates of the present invention have some performance characteristics similar to monolithic polyurethane but at a lower cost. Improvements vs. standard glass/PVB/glass laminates include high penetration resistance at high adhesion and much less sensitivity of penetration resistance to test temperature.

In the present invention, the polyurethane layers are preferably less than 5 mils thick. The preferred range is 1–4 mils. The PVB layer is generally less than about 60 mils thick and preferably in the range of 15–30 mils. In the preferred embodiment, the PVB layer is 20–28 mils thick and is sandwiched between two layers of polyurethane.

However, in other embodiments, a single layer of polyurethane is applied to just one side of the PVB. Such embodiments can be used in laminates having polyethylene terephthalate (PET) layers.

The thin layers of polyurethane used in the present invention are preferably based upon an aliphatic isocyanate-polyether (or polyester) urethane and include a UV stabilizer and an antioxidant in order to achieve the required stability when exposed to heat and UV light. In addition, the polyurethane layers should be formulated to obtain high adhesion to glass by the incorporation of silane coupling agents or other suitable chemistries. Such techniques are well known to those of skill in the art. Suitable techniques are disclosed in U.S. Pat. No. 3,965,057.

PVB resin is produced by known aqueous or solvent acetalization processes reacting polyvinyl alcohol polymer (PVOH) with butyraldehyde in the presence of acid catalyst, followed by neutralization of the catalyst, separation, stabilization and drying of the resin. It is commercially available from Solutia Inc. as Butvar® resin. PVB resin typically has a weight average molecular weight greater than 70,000, preferably about 100,000 to 250,000, as measured by size exclusion chromatography using low angle laser light scattering. On a weight basis, PVB typically comprises less than 22%, preferably about 17 to 19% hydroxyl groups calculated as polyvinyl alcohol (PVOH); up to 10%, preferably 0 to 3% residual ester groups, calculated as polyvinyl ester, e.g. acetate, with the balance being acetal, preferably butyraldehyde acetal, but optionally including a minor amount of acetal groups other than butyral, for example 2-ethyl hexanal.

The PVB resin of the sheet is typically plasticized initially with about 10 to 70 and more commonly 30 to 45 parts plasticizer per hundred parts of resin. The final concentration of the plasticizer in the PVB sheet will be lower, depending upon the amount of migration that occurs. The amount of migration that occurs can be controlled by a number of factors which are discussed in greater detail below. Plasticizers commonly employed are esters of a polybasic acid or a polyhydric alcohol. Suitable plasticizers are triethylene glycol di-(2-ethylbutyrate), triethyleneglycol di-(2-ethylhexanoate), tetraethyleneglycol diheptanoate, dihexyl adipate, dioctyl adipate, mixtures of heptyl and nonyl adipates, dibutyl sebacate, polymeric plasticizers such as the oil-modified sebacic alkyds, and mixtures of phosphates and adipates, adipates and alkyl benzyl phthalates and mixed adipates made from $C_4$ to $C_9$ alkyl alcohols and cyclo $C_4$ to $C_{10}$ alcohols. $C_6$ to $C_8$ adipate esters such as dihexyl adipate are preferred plasticizers. A more preferred plasticizer is ethylene glycol di(2-ethylhexanoate). The amount of plasticizer used is a convenient means to modify and control the stiffness of the PVB. A useful surrogate property for stiffness is the glass transition temperature (Tg), which is directly related to the level of plasticizer. The plasticized PVB component used in the polymer composites of this invention will generally have a Tg of about 30–45° C. after plasticizer equilibration has taken place.

As used herein, glass transition temperature ($T_g$) of interlayer materials such as plasticized polyvinyl butyral and polyurethane elastomer can be determined by rheometric dynamic analysis, e.g. measuring a peak tan delta which can be the ratio of shear loss modulus (G") to shear storage modulus (G') or, alternatively, the ratio of tensile loss modulus (E") to tensile storage modulus (E'). The values reported herein were determined by a shear mode analysis using the following procedure. For instance, the thermoplastic polymer material is molded into a sample disc of 25 millimeters (mm) in diameter. The polymeric sample disc is placed between two 25 mm diameter parallel plate test fixtures of a Rheometrics Dynamic Spectrometer II. The polymeric sample disc is tested in shear mode at an oscillation frequency of 1 Hertz as the temperature of the sample is increased from −20 to 70° C. at a rate of 2° C./minute. The position of the maximum value of tan delta (damping) plotted as dependent on temperature is used to determine $T_g$. Experience indicates that the method is reproducible to within +/−1° C.

It is important to note that the PU component of the assembled PU/PVB/PU composite in the preferred embodiment contains a certain level of plasticizer that has migrated from the PVB layer. This level is controlled by the migration of the plasticizer from the PVB layer and is dependent upon the partitioning of the plasticizer between the polyurethane and PVB layers. The partition coefficient which can be measured and used to predict the migration of plasticizer and the equilibrium compositions of the layers is affected by the composition of the polyurethane layer, the plasticizer type utilized and the hydroxyl content of the PVB resin used. The interfacial surface topography between the plasticized PVB and PU layers which is primarily controlled by the fabrication method (e.g., coextrusion, extrusion coating, etc.) will influence the rate at which equilibrium is achieved once the layers are combined. However, it will be appreciated that composites can be constructed in which no migration occurs or in which plasticizer migration occurs from the PU layer to the PVB layer.

It is also often useful or desirable to incorporate a UV absorber in the PVB. In addition to plasticizer, and optional UV absorber, PVB sheet may contain other performance-enhancing additives such as pigments or dyes for coloring all or part of the sheet, antioxidants and the like. There is no need for addition of adhesion control agents to the PVB sheet component since PVB/glass adhesion is not a consideration for this use. PVB sheet is prepared by mixing combined plasticizer and other additives (e.g. UV-absorber and the like) with PVB resin and forcing the mixture under pressure through a die opening to form a sheet.

The laminates of the present invention can be prepared by conventional methods known to those of skill in the art. In order to achieve smooth interfacial topography and acceptable interfacial optics, the preferred process method for combining the PU and plasticized PVB layers is coextrusion. Through proper selection of the PVB and PU composition it is possible that the PU/PVB/PU composite can be reblended at low levels into the core PVB layer for effective material utilization and lower costs without negative impact on laminate quality. Less preferred process methods include extrusion coating followed by two-ply lamination and two-pass extrusion coating. However, with these less preferred methods PU/PVB interfacial surface topography needs to be carefully controlled or else undesirable optical haze can be encountered even if the refractive indices of the PU and PVB component are closely matched.

The multi-layer laminates of the present invention are preferably used in laminated glass wherein the laminate is sandwiched between two sheets of glass. In other embodiments, sheets of polycarbonate can be affixed to the composite interlayer.

The present invention provides numerous advantages over prior art interlayers used in glass laminates. These improvements include high penetration resistance at high adhesion and much less sensitivity of penetration resistance to temperature. Additionally, the effect of moisture on adhesion is much less with the present invention. Further, the incorporation of a thin layer of polyurethane improves the acoustic performance of the laminate versus standard PVB interlayers.

EXAMPLES 1–6

A series of samples were tested to illustrate the relationships between adhesion and temperature vs. penetration resistance for various glass laminates. The following table illustrates the effect of pummel adhesion and interlayer/composite type on penetration resistance at 24° C. (75° F.) and −18° C. (0° F.).

TABLE 1

| Ex. # | Description | Gauge | Pummel | Test Temp | MBH Meters (ft) | Test Temp | MBH Meters (ft) |
|---|---|---|---|---|---|---|---|
| 1 | .004" PU/.022" PVB/.004" PU | .030" | 8.6 | 24° C. | 8.5 (27.8) | −18° C. | 5.3 (17.5) |
| 2 | Plasticized PVB sheet (Saflex ® RB41) | .030" | 7.4 | 24° C. | 4.7 (15.5) | −18° C. | 1.3 (4.3) |
| 3 | BUTVAR ® resin Plasticized PVB (Saflex ® RC41) | .030" | 3.8 | 24° C. | 7.2 (23.5) | −18° C | 2.1 (7.0) |
| 4 | .013" PVB/.004" PU/.013" PVB | .030" | 7.1 | 24° C. | 4.0 (13.1) | −18° C. | |
| 5 | .013" PVB/.004" PU/.013" PVB | .030" | 4.4 | 24° C. | 7.7 (25.2) | −18° C. | 2.8 (9.2) |
| 6 | PU (AG8451) | .030" | 7.6 | 24° C. | 5.0 (16.4) | −18° C. | 5.2 (16.9) |

Notes:
1. AG8451 PU was used for all of these Examples and is an aliphatic isocyanate polyether based polyurethane film commercially available from Thermedics Inc. of Woburn, MA for use with laminated glass. It contains functional chemistry to provide for high adhesion to glass.
2. The above penetration resistance tests were conducted on 12" × 12"-5 lb. ball drop test (energy method).
3. The PBV sheet used for Examples 2 and 3 was standard, commerically available Saflex ® PBV interlayer made by Solutia Inc. using 3GEH (triethylene glycol di-2-ethyl hexanoate) plasticizer. Other than the difference in thickness, the PBV sheet used for Examples 1, 4 and 5 was comparable to that used for examples 2 and 3.
4. The various composites described in Example 1, 4 and 5 were prepared by hand assembly of components.

Examples 4 and 5 show that the incorporation of polyurethane as a core layer does not significantly affect the expected relationship between PVB/glass adhesion and penetration resistance as compared to std. PVB laminates (see examples 2 and 3). Also, the relationship between test temperature and penetration resistance for laminates made from such PVB/PU/PVB multilayers is also similar to that found for single layer PVB laminates (compare example 5 vs. example 3).

EXAMPLES 7–10

These examples illustrate the composition changes (plasticizer migration) that occur in both the PVB and PU components after the layers are combined. They also highlight the changes in properties (Tg and RI) that are important considerations for the composite. They demonstrate how the use of different thicknesses will result in different composite structures (phr level of each component) which will affect physical properties (modulus/stiffness), rheological (e.g., handling characteristics during laminate assembly and flow properties during autoclave lamination) and optical properties (RI mismatch and accompanying effect on haze).

Plasticized PVB is sandwiched between two layers of PU. The amount of plasticizer migration that occurs is determined by first separating the various layers, drying each layer at 70° C. for one hour to reduce water content <0.2%, measuring initial weights and then extracting the plasticizer from each layer using a mixture of hexane and ethyl acetate (75/25 ratio). Usually it is sufficient to agitate small ¼"×¼" pieces in the solvent mixture for 24 hours to completely extract the plasticizer. (However, the use of a Soxhlet/reflux type extraction apparatus or equivalent may be necessary to ensure that all plasticizer is removed with some PVB and PU formulations.) After the hexane/ethyl acetate solvent is evaporated from the individual extracted layers, the layers are reweighed and plasticizer content is determined. Appropriate adjustment of results may be necessary to account for other extractable components such as antioxidants and UV stabilizers.

| Ex. # | PU Thick. (mils) | PVB Thick. (mils) | phr PVB (initial) | Phr PVB (final) | Tg, °C. (PVB) | RI$_{PVB}$ (final) | Phr PU (final) | RI$_{PU}$ (final) | ΔRI RI$_{PVB}$ − RI$_{PU}$ |
|---|---|---|---|---|---|---|---|---|---|
| | | | | | AG8451 | | | | |
| 7 | 1 | 28 | 38 | 35.0 | 33.1 | 1.481 | 30.8 | 1.484 | −.003 |
| 8 | 4 | 22 | 38 | 26.4 | 40.0 | 1.483 | 23.2 | 1.487 | −.004 |
| | | | | | AG5050 | | | | |
| 9 | 1 | 28 | 38 | 33.5 | 34.3 | 1.481 | 45.9 | 1.474 | +.007 |
| 10 | 4 | 22 | 38 | 22.5 | 43.1 | 1.484 | 30.9 | 1.480 | +.004 |

Notes:
1. Above plasticizer results are predictions based upon a model which has been verified by empirical measurements to be accurate.
2. Partition coefficient = $K_d$ = Phr (PU)/Phr (PVB)
3. Partition coefficient ($K_d$) has been determined by 24 hour immersion of polyurethane film and plasticized PBV in plasticizer and determination of relative equilibrium concentration. Empirical confirmation of model has been made by making PU/PBV/PU composites, allowing equilibrium to take place, and then conducting plasticizer analysis of individual layers (via extraction method).The model was shown to be quite accurate and compositional equilibrium was found to occur quite rapidlyand did not require autoclave lamination to effect changes.
4. Initial refractive index (RI) of PU (unplasticized) and PVB (38 hpr) components are as follows:
  AG8451: 1.496
  AG5050: 1.492
  PVB (38 phr): 1.480
5. AG5050 PU is aliphatic isocyanate polyether based polyurethane film available from Thermedics Inc. of WoBurn, MA. for use with laminated glass. Contains functional chemistry to provide for high adhesion to glass.
6. Tg of PBV (38 phr) before combination ~31 °C.

While the present invention has been described with respect to the presently preferred embodiments, it will be appreciated by those skilled in the art that numerous changes can be made to the disclosed embodiments without departing from the sprit or scope of the invention. Accordingly, the scope of the invention is defined by the following claims rather than by the foregoing description.

What is claimed is:

1. A process for forming a multilayer composite suitable for use in glass laminates, said process comprising:
   coextruding a first layer comprising a plasticized polyvinyl butyral and a second layer adjacent to said first layer comprising polyurethane under conditions wherein plasticizer can migrate from said polyvinyl butyral to said polyurethane.

2. The process of claim 1 wherein the polyurethane layer has a thickness of less than 5 mils.

3. The process of claim 1 further comprising coextruding a third layer comprising polyurethane on a side of the polyvinyl butyral layer opposite the second layer.

4. The process of claim 3 wherein the second and third polyurethane layers each have a thickness of less than 5 mils.

* * * * *